United States Patent [19]

Fuchs et al.

[11] 3,930,795

[45] Jan. 6, 1976

[54] PROCESS FOR THE LEVEL DYEING OF WOOL

[75] Inventors: Hermann Fuchs; Hermann-Heinz Konrad, both of Kelkheim, Taunus, Germany

[73] Assignee: Hoechst Aktiengesellschaft, Frankfurt am Main, Germany

[22] Filed: Sept. 6, 1973

[21] Appl. No.: 394,798

[30] Foreign Application Priority Data

Sept. 8, 1972 Germany............................ 2244240

[52] U.S. Cl............................................ 8/54; 8/1 N
[51] Int. Cl.² ...................... C09B 49/00; D06P 3/14
[58] Field of Search ................ 8/54, 128 A, 17, 1 N

[56] References Cited
UNITED STATES PATENTS

| | | | |
|---|---|---|---|
| 2,643,958 | 6/1953 | Kleiner | 8/17 |
| 3,278,253 | 10/1966 | Weckler | 8/17 |

OTHER PUBLICATIONS

Journal of the Society of Dyers and Colourists, Vol. 88, Mar. 1972, No. 3, pp. 93–100.

*Primary Examiner*—Benjamin R. Padgett
*Assistant Examiner*—Donald P. Walsh
*Attorney, Agent, or Firm*—Curtis, Morris & Safford

[57] ABSTRACT

Process for the level dyeing of wool, having an antifelting finish consisting of a coating layer of polyimine or polyamine resin, according to the exhaustion method with reactive dyestuffs which contain two or more sulfonic acid or sulfonate groups — without considering the sulfonic acid or sulfonate groups which may be contained in the fiber-reactive groupings — in the molecule or with conbinations of such dyestuffs having a different absorbing capacity from an aqueous bath at elevated temperature, in which process benzene sulfonic acids, alkylbenzene sulfonic acids, naphthalene sulfonic acids, alkylnaphthalene sulfonic acids or the condensation products of naphthalene sulfonic acids with formaldehyde or cresols are added to the dyeing liquor.

5 Claims, No Drawings

PROCESS FOR THE LEVEL DYEING OF WOOL

The present invention relates to a process for the level dyeing of wool.

When dyeing wool, especially woolen material having an anti-felting finish and most especially woolen fibers which have a polyimine or a polyamine coating layer (as it is disclosed in Melliand Textilberichte 9/1971, page 1100 or in Journal of the Society of Dyers and Colorists volume 88, number 3/1972, pages 93–100) preventing them from felting, level dyeings are until now very difficult to obtain. This undesired property is due to the fact that novel groups of the wool having affinity to the dye are activated by the anti-felting finish to effect the salt-like or reactive binding of dyestuff. The higher the affinity of the wool, however, the greater the difficulties to obtain level dyeings on that fibrous material. These difficulties are even increased when combinations of two or more dyestuffs are applied their affinity to the fiber generally being different from one another. Such woolen material having an anti-felting finish can, however, only be dyed with reactive dyestuffs for the sake of fastness, because a textile article of that kind stands a repeated washing without felting in household washing machines at 60°C using at the same time perborate-containing detergents and must, therefore, be color-fast.

are required. [cf. Textilveredlung 7, (1972), No. 5, pages 297–307].

The levelling property of a dyestuff or a dyestuff combination is examined by means of a knitted or woven fabric made of yarn dyed in the hank. As soon as this test material shows barriness in the individual knitting rows the dyeing is considered to be unuseful. This examination is carried out in the manner described because wool having an anti-felting finish is especially used for knitting yarns, and the corresponding dyeings must meet these requirements in view of the levelness in the knitting procedure.

It has been found that the disadvantages and difficulties mentioned above which hitherto arose in the dyeing of wool, having an anti-felting finish consisting of a coating layer of polyimine or of polyamine resin according to the exhaustion method with reactive dyestuffs can be overcome and that completely level dyeings with reactive dyestuffs containing two or more sulfonic acid or sulfonate groups — without the sulfonic acid or sulfonate groups which may be contained in the fiber-reactive groupings — in the molecule can be obtained on these textile materials which dyeings meet the fastness requirements which the articles made thereof must possess, when the dyeings are carried out with such a dyestuff or with combinations of such dyestuffs having a different absorbing property from an aqueous bath at elevated temperature and with the addition of compounds of the general formulae

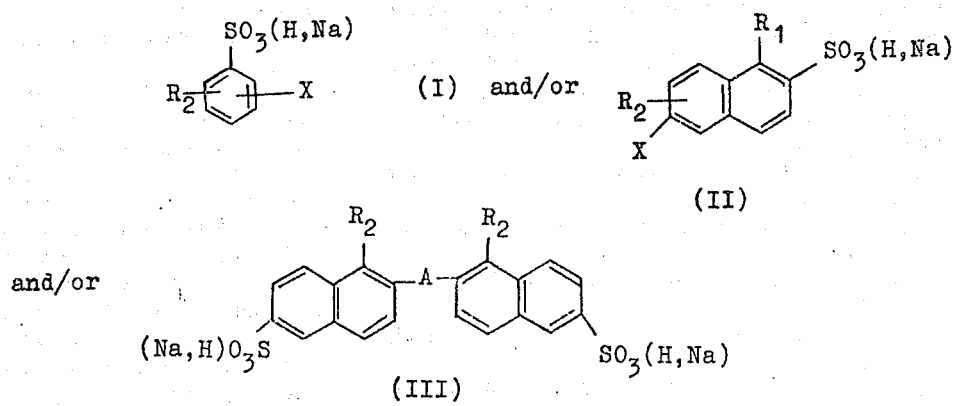

Only dyeings prepared by fiber-reactive dyestuffs which are sufficiently fast to wet processing can meet the high requirements necessary to stand several washings at 60°C. Among those dyestuffs just the reactive dyestuffs generally used strongly mark the differences of the affinity depending on the material in the case of polyamide fibers. This disadvantage is especially caused when dyeing with dyes in combinations which show an absorption capacity different from one another on account of their different content of —$SO_3H$ groups in the dyestuff molecule (without considering —$SO_3H$ groups which may be contained in the reactive groups). This phenomenon is especially mentioned in Journal of the Society of Dyers and Colorists, loc. cit., page 96. The usual anti-felting finishes or the treatments of the wool which reduce felting, however, make the differences of affinity depending on the material even greater. Attempts have already been made to master the problem of unlevel reactive dyeings on wool with the preparation of suitable dyestuffs. Experience shows, however, that in this field the dyestuffs can be adapted to the conditions given only to a limited extent because of other dyeing and fastness properties which in which X stands for a hydrogen atom or the radical of the formula —$SO_3(H,Na)$, $R_1$ stands for an alkyl radical having 2 to 14 carbon atoms, $R_2$ stands for a hydrogen atom or an alkyl radical having 2 to 14 carbon atoms and A is a bridge-member of the formula —$CH_2$— or

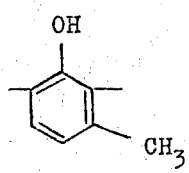

These products of the formulae I, II and III which are known as wetting or dispersing agent show a certain levelling action due to their dispersing effect in the dyeing of synthetic fibers with water-insoluble disperse dyes. It could, however, not be foreseen that they can equalize the differences of the affinity given by the wool itself and by the dyestuffs when they are applied with water-soluble reactive dyestuffs on wool having an anti-felting finish.

It could, neither, be foreseen and, therefore, was surprising that the levelling action described above was only obtained with dyestuffs or dyestuff combinations when two or more unreactive —SO$_3$H groups are contained in the dyestuff molecule. Thus the process of the invention allows to dye even the fairest shades in a satisfactory and level manner.

As it is disclosed in Journal of the Society of Dyers and Colourists, loc.cit., page 97, the wool having an anti-felting finish is, in principle, washed before carrying out the dyeing operations and then thoroughly rinsed. The following operation steps are important for the levelness of the dyeings obtained in accordance with the invention and should therefore be observed. The dyebath is prepared with water of about 40°C with a goods-to-liquor ratio of 1:10 to 1:60, preferably, 1:10 to 1:30, and mixed with the usual chemical substances, such as penetrating adjuvants and those regulating the pH, except the acids required for dyeing, but above all, with the products of the formulae I, II or III applied in amounts of from 0.2 to 2 % preferably from 0.5 to 1 % calculated on the weight of the dry wool.

To be completely distributed the liquor is brought for about 10 minutes into contact with the wool to be dyed and having an anti-felting finish. The reactive dyestuffs mentioned above having two or more unreactive sulfonic acid groups in the dyestuff molecule are dissolved with hot water poured over them and added to the dyebath after the period of the pretreatment operation is over. Now, too, the dyeing operation is continued for another 10 minutes at 40°C to distribute the dyestuff equally before the amounts of acid required for dyeing are added to the dyebath. These amounts of acid are adapted to the dyestuff amounts and are used in the following order:

up to 0.3 % of dyestuff the pH 6.5 is adjusted with acetic acid up to 1 % of dyestuff the pH 6.3 is adjusted with acetic acid above 1 % of dyestuff the pH 6 is adjusted with acetic acid above 2.5 % of dyestuff the pH 5.5 is adjusted with acetic acid above 3.5 % of dyestuff the pH 5 is adjusted with acetic acid.

After a short period of adjustment the dyebath is heated to 85°C within 45 minutes and maintained at that temperature for 25 to 30 minutes. In the course of the operation the reactive dyestuffs initially undergo with the wool a salt-like addition which is then converted to become a reactive bond progressively while slowly increasing the temperature by about 1° to 2°C per minute. (cf. Textil-Praxis 1971, 3rd edition pages 164–167). The dyeing is completed at the boiling temperature or at 110°C during 30 to 50 minutes. In the case of dark dyeings, i.e. using about 1 % dyestuff and more, the dyeings are generally after-treated in the same bath at elevated pH (about 6.8) in order to assure the fastness properties required for the dyed woolen material to stand a treatment in the washing machine at 60°C. For this purpose, an alkali-yielding agent, preferably sodium trichloroacetate, is introduced into the bath, in accordance with the invention, in amounts capable of changing the pH of the liquor during the after-treatment gradually from the acid in direction to the neutral range.

According to the invention, the dyeing of the wool having an anti-felting finish can be performed in any processing stage on suitable dyeing machines, for example, exhaustion dyeing apparatus, winch vat, paddle dyeing machine and others. The material is present in the form of combed material, yarn, woven and knitted fabric, finished pullover or finished pullover parts or of piece goods.

Even fast running dyeing machines, for example, the yarn dyeing machine of the System of Bellmann, allow to dye very sensitive shades, for example, beige, fair blue with the use of, for example, three dyestuffs, by means of the products of the formulae I, II or III, when changing the process in corresponding manner which is necessary because of the high liquor through-put in the machine. Under these conditions useful dyeings could not be obtained until now.

Suitable reactive dyestuffs for the process of the invention are, for example, the following dyestuff types:

Dyestuffs which contain a vinylsulfone group or form such a group under given dyeing conditions, and which react over that group with the reactive groups of the polyamide fibers, for example, dyestuffs containing sulfatoethylsulfone groups, chloroethylsulfone groups, methyltaurinoethylsulfone groups or thiosulfatoethylsulfone groups;

Dyestuffs which react with the fiber over a substituted or unsubstituted acrylamide group, for example, those containing α-bromoacrylamide or β-(2,2,3,3-tetrafluoro-cyclobutyl)-acryloylamino groups;

Dyestuffs which contain the following atom grouping as reactive group:

Mono- and dichlorotriazine, trichloropyrimidine, monochlorodifluoropyrimidine, monochloroacetic acid amide, chloro- or sulfatopropyl amide, alkylsulfone propyl amide, dichlorophthalazine, benzochlorothiazole, dichloropyridazone, dichloropyrazine and methylsulfonyl-methyl-chloropyrimidine groups.

This synopsis of dyestuffs which can be used in the process of the invention is to be applied under the condition the the colour-yielding molecule contains two or more sulfonic acid or sulfonate groups, the —SO$_3$H or —SO$_3$Na groups optionally in the fiber-reactive groups not being counted because they are, generally, split off. The chromophorus part of these water-soluble dyestuffs may, itself, have the most varying structure; however, azo and anthraquinone dyestuffs are, preferably, used. Dyestuffs of the type used according to this invention are described in Colour Index, 3rd Edit., Vol. 3 under the designation "Reactive Dyes".

The products of the formulae I, II and III used in the novel process are described in H. Rath, Lehrbuch der Textilchemie, 2nd edition, 1963 pages 660–661.

The following Examples illustrate the invention:

EXAMPLE 1

Finished pullover parts made of wool, having an anti-felting finish, were dyed on a paddle-dyeing machine with a goods-to-liquor ratio of 1 : 20. The anti-felting finish of the wool was effected according to the process described in Melliand Textilberichte 9/1971, page 1100 and in Journal of the Society of Dyers and Colourists, volume 88, page 93 et seq.

To dye the textile material the dyebath was prepared at 40°C and the aqueous liquor was mixed with the following products (in % each calculated on the dry weight of the wool):
  0.74 % of the reaction product of 1 mol of stearyl amine with 10 mols of ethylene oxide,
  0.26 % of dodecylsulfonic acid
  2.0 % of ammonium acetate
  0.5 % of the condensation product of formaldehyde and naphthalene sulfonic acid.

The liquor so prepared was allowed to contact with the material to be dyed during 10 minutes at 40°C and then 0.7 % of the reactive dyestuff of the formula

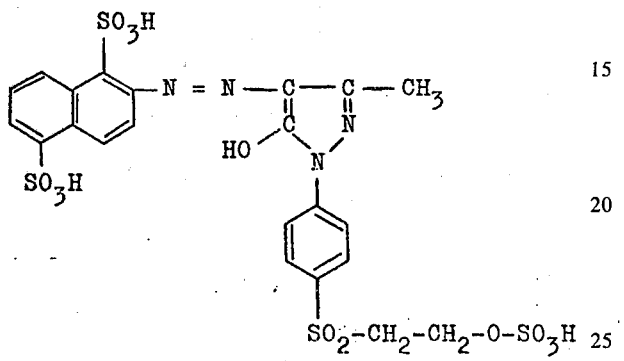

1.7 % of the reactive dyestuff of the formula

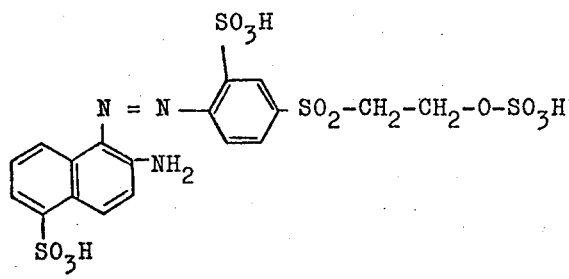

and 0.7 % of the reactive dyestuff of the formula

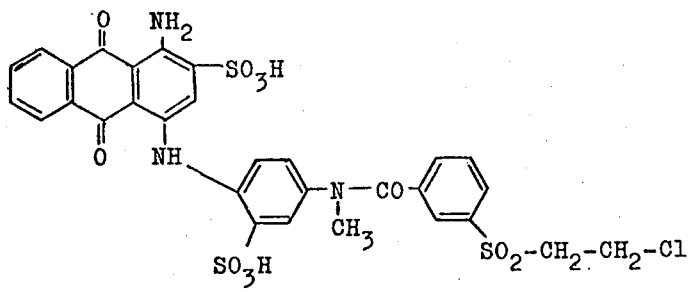

in the commercial form adjusted with methyl taurine and dissolved in hot water, were added to this bath.

After a further 10 minutes the dyebath was ajusted to pH 5.5 with acetic acid and heated from 40° to 85°C within 45 minutes. The material was dyed at 85°C during 25 minutes, then the liquor was brought to the boiling point by raising the temperature by 1° to 2°C per minute and dyeing was continued for a further 60 minutes under these conditions. Within this boiling period 2.5 % of sodium trichloroacetate were added to the dyebath 40 minutes after boiling began to improve the fastness properties of the dyeing.

Finally, the material dyed was rinsed gradually with hot and cold water. A very level and fast brown dyeing was obtained.

Without adding the formaldehyde-naphthalene-sulfonic acid condensation product the same dyeing operation yielded an unlevel dyeing which was so unuseable.

EXAMPLE 2

Woolen knitting yarn, having an anti-felting finish was dyed on a hank dyeing machine of the System of Bellmann with a goods-to-liquor ratio of 1 : 60.

The bath was prepared with water of 70°C, to which the following products (in % calculated on the dry weight of the wool) were added:
  0.74 % of the reaction product of 1 mol of stearyl amine with 10 moles of ethylene oxide,
  0.26 % of dodecylsulfonic acid,
  0.5 % of the condensation product of formaldehyde and naphthalene sulfonic acid and
  2.0 % of ammonium acetate
and it was adjusted to pH 6.3 with acetic acid. The liquor so prepared was allowed to contact the material to be dyed at 70°C for 2 minutes to which 0.75 % of the reactive dyestuff of the formula

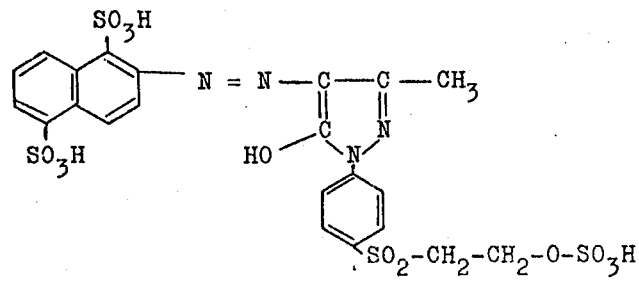

0.005 % of the reactive dyestuff of the formula

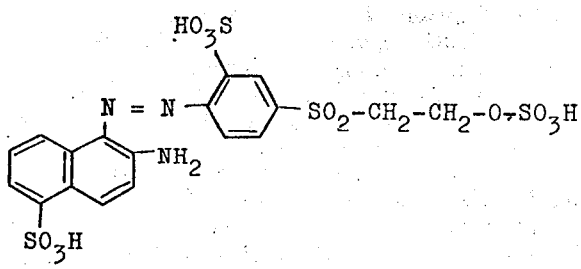

and 0.0035 % of the reactive dyestuff of the formula

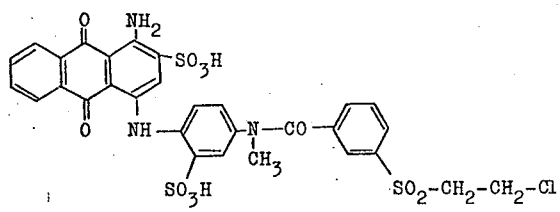

in commercial form adjusted with methyl taurine and dissolved in hot water were added. After a further 2 minutes of contact of the goods with the liquor, the dyebath was heated to 110°C during about 10 minutes and the material was dyed at that temperature during 10 minutes. The dyebath was then rapidly cooled (within about 5 minutes) to 90°C, the dyed fibrous material was removed from the dyeing apparatus to be rinsed. The dyeing was rinsed gradually with hot and cold water. A very level dyeing was obtained.

A dyeing produced under the same conditions without the addition of the condensation product of formaldehyde with naphthalene sulfonic acid could absolutely not be used for knitting because it was not level.

EXAMPLE 3

Knitted fabrics in pieces made of wool, having an anti-felting finish, were dyed on a winch vat with a goods-to-liquor ratio of 1 : 30.

The dyebath was prepared with water of 40°C, to which the following products (in % calculated on the dry weight of the wool) were added:
  0.74 % of the reaction product of 1 mol of stearyl amine with 10 mols of ethylene oxide,
  0.26 % of dodecylsulfonic acid,
  0.8 % of dibutylnaphthalene sulfate and
  2.0 % of ammonium acetate,
and the material was dyed in that liquor. After a period of 10 minutes of pretreatment at 40°C, 4 % of the reactive dyestuff of the formula

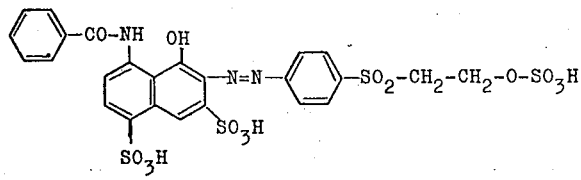

and 0.6 % of the reactive dyestuff of the formula

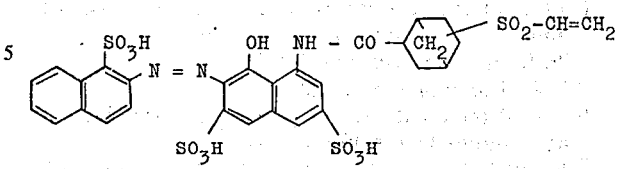

in commercial form adjusted with methyl taurine and dissolved in hot water were added to the bath and the dyeing operation was continued for another 10 minutes. The pH of the bath was adjusted to 5 with acetic acid, then the temperature of the dyeing liquor was raised to 85°C within 45 minutes and the material was dyed at 85°C for 25 minutes. The liquor was brought to the boil by raising the temperature by 1° to 2°C per minute and dyeing was continued for another 70 minutes under these conditions whereafter 2.5 % of sodium trichloroacetate were added to the bath, after a boiling period of 50 minutes, to improve the fastness properties of the dyeing. Finally the dyed material was rinsed gradually with hot and cold water. A very level fast red dyeing was obtained.

EXAMPLE 4

Combed material made of wool having an anti-felting finish was dyed on the dyeing apparatus with a goods-to-liquor of 1 : 12.

The bath was prepared as in Example 1, but in this case 0.5 % of the condensation product of 1 mol of m-cresol with 2 mols of naphthalene sulfonic acid were used instead of the condensation product of formaldehyde with naphthalene sulfonic acid, and to that liquor 4 % of the reactive dyestuff of the formula

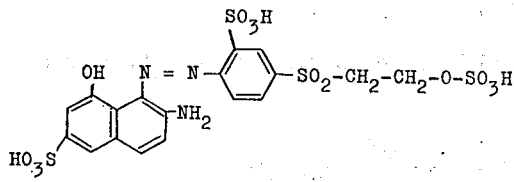

and 0.2 % of the reactive dyestuff of the formula

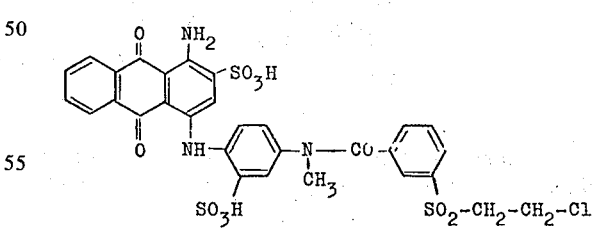

in commercial form adjusted with methyl taurine and acidified to pH 5 with acetic acid, were added. The further course of the operation and the after-treatment were analogous to that of Example 1, but the dyeing temperature of the liquor was brought to 106°C (instead of the boiling temperature). A very level claret dyeing having very good fastness properties on the wool was obtained.

When using the same amounts of sodium dodecyl-benzene sulfonic acid instead of the condensation product of 1 mol of m-cresol with 2 mols of β-naphthalene sulfonic acid under the dyeing conditions given in Example 1 the dyeings were equally level.

EXAMPLE 5

Yarn in hanks made of wool, having an anti-felting finish was dyed on the hand dyeing machine with a goods-to-liquor ratio of 1 : 20.

The bath was prepared with the adjuvants used in the same amounts indicated in Example 1 and, after a pretreatment of 10 minutes with the material, 0.1 % of the reactive dyestuff of the formula

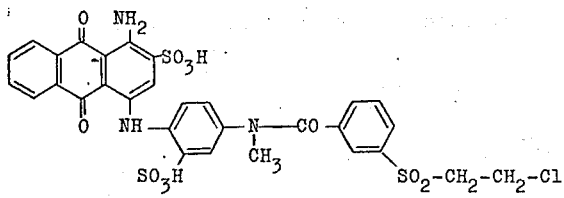

and 0.008 % of the reactive dyestuff of the formula

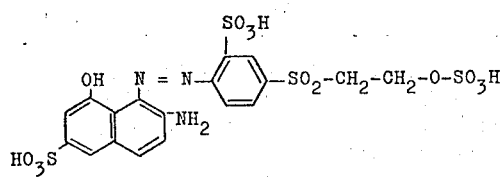

in commercial form adjusted with methyl taurine and dissolved in hot water were added to the bath. After a further 10 minutes the pH of the dyebath was adjusted to 6.5 with acetic acid and the dyeing operation was effected in the manner analogous to that described in Example 1. After a boiling period of 30 minutes the dyeing was completed and the material so dyed was rinsed, without after-treatment with sodium trichloroacetate, with hot and cold water. A very level fair blue dyeing was obtained which did not show any shade differences in the knitting row when knitting the yarn.

EXAMPLE 6

Yarn in hanks made of wool, having an anti-felting finish, was dyed on the hand dyeing machine with a goods-to-liquor ratio od 1 : 20.

The dyebath was prepared with the adjuvants used in Example 1 and, after a pretreatment of 10 minutes with the material, 0.1 % of the reactive dyestuff of the formula

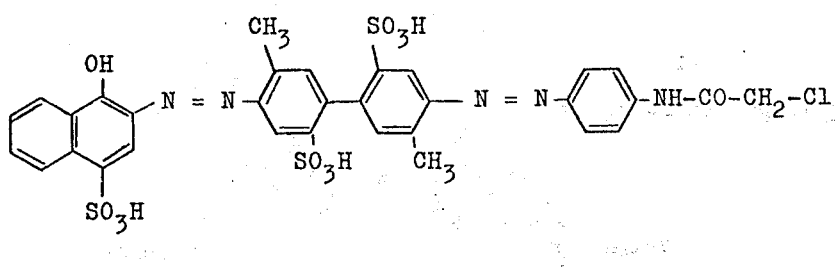

in commercial form and dissolved in hot water were added to the liquor. The pH of the dyebath was adjusted to 6.5 with acetic acid after a further 10 minutes and the dyeing operation was carried out as in Example 1. After a 30 minutes' boiling period the dyeing operation was completed and the material so dyed was rinsed with hot and cold water, without the after-treatment with sodium trichloroacetate. A very level pink dyeing useable according to the knitting test was obtained.

EXAMPLE 7

Knit goods in pieces made of wool, having an antifelting finish, were dyed on the winch vat with a goods-to-liquor ratio of 1 : 30.

The following commercial dyestuffs were added to the bath: 0.2 % of the reactive dyestuff of the formula

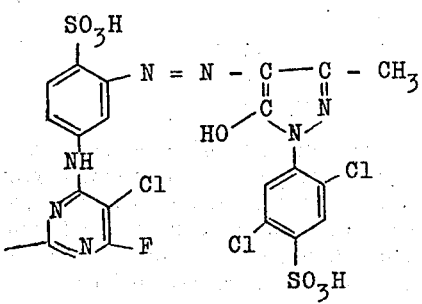

0.2 % of the reactive dyestuff of the formula

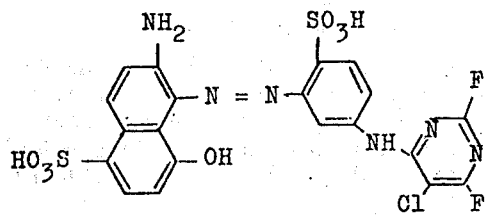

0.15 % of the reactive dyestuff of the formula

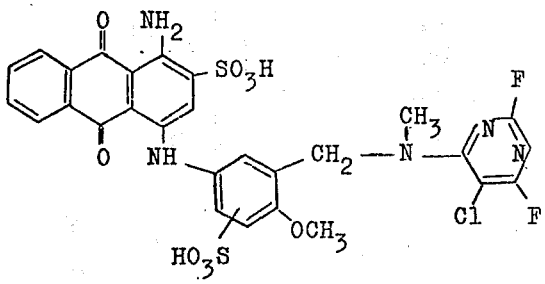

The pH of the liquor was adjusted to 6.3 with acetic acid and the dyeing operation was the same as described in Example 1. A very level beige dyeing was obtained.

EXAMPLE 8

Knitting yarn made of wool, having an anti-felting finish, was dyed on the dyeing machine with a goods-to-liquor ratio of 1 : 12.

The bath was prepared as in Example 1 the dyestuff used, however, being 0.1 % of the reactive dyestuff of the formula

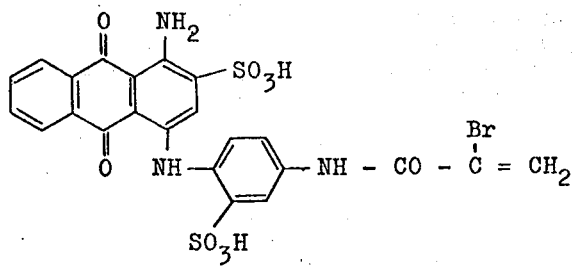

in commercial form. The pH of the liquor was adjusted to 6.5 with acetic acid and the dyeing operation was effected in the manner described in Example 1. The after-treatment of the material so dyed with sodium trichloroacetate was not necessary. A fair blue dyeing having a perfect levelness was obtained.

Without adding the condensation product of formaldehyde and naphthalene sulfonic acid and carrying out the same working method as described in the preceding example an unuseable dyeing with differences of levelness in the knitting was obtained.

EXAMPLE 9

Knit goods in pieces (pullover parts) made of wool, having an anti-felting finish, were dyed on the paddle dyeing machine with a goods-to-liquor ratio of 1 : 20 according to the method indicated in Example 1 while using 0.06 % of the reactive dyestuff of the formula

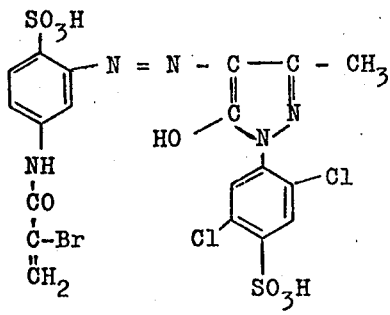

0.03 % of the reactive dyestuff of the formula

NH₂ ... (structure shown)

0.03 % of the reactive dyestuff of the formula (structure shown)

in commercial form. The pH of the liquor was adjusted to 6.5 with acetic acid and the dyeing operation was effected as in Example 1. The after-treatment of the dyed material with sodium trichloroacetate was not necessary. A very level and well penetrated dyeing of the knitted pieces was obtained.

Without adding the condensation product of formaldehyde with naphthalene sulfonic acid and proceeding in the same manner as unlevel, unuseable dyeing was obrained which became visible when tearing the loops of the knitted fabric.

We claim:

1. A process for the level dyeing of wool, having an anti-felting finish consisting of a coating layer of polyimine or of polyamine resin, according to the exhaustion method, with reactive dyestuffs which contain two or more sulfonic acid or sulfonate groups, other than sulfonic acid or sulfonate groups contained in the fiber-reactive groupings, which process comprises: carrying out the dyeings with a dyestuff or with a combination of dyestuffs having different absorbing capacity, from an aqueous bath at elevated temperature and adding at least one compound of the formula

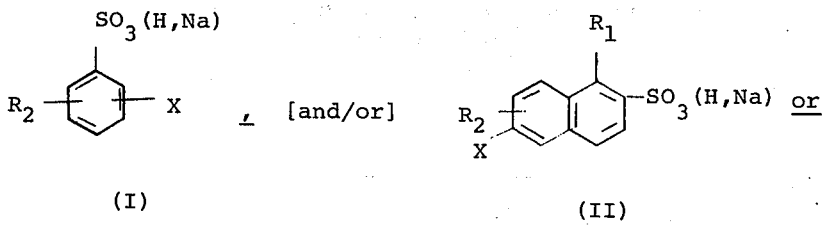

[and/or of the formula]

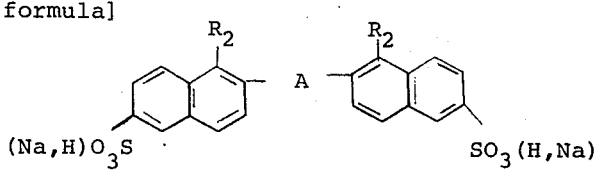

(III)

wherein X is hydrogen or the radical of the formula —SO₃(H,Na), R₁ is alkyl having 2 to 14 carbon atoms, R₂ is hydrogen or alkyl having 2 to 14 carbon atoms and A is a bridge-member of the formula —CH₂— or

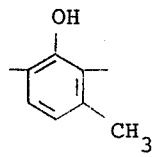

2. A process as claimed in claim 1, wherein the compounds of the formulae I, II or III are used in amounts of from 0.2 to 2 %, calculated on the weight of the dry wool.

3. A process as claimed in claim 2, wherein the compounds of the formulae I, II or III are used in amounts of from 0.5 to 1 %, calculated on the weight of the dry wool.

4. A process as claimed in claim 1, wherein an alkali-yielding agent is allowed to act on the dyeings in the same bath in an amount capable of changing the pH of the liquor gradually from the acid to the neutral range in the course of the after-treatment operation.

5. A process as claimed in claim 4, wherein the alkali-yielding agent is sodium trichloroacetate.

* * * * *